US009184000B2

(12) United States Patent
Yen et al.

(10) Patent No.: US 9,184,000 B2
(45) Date of Patent: Nov. 10, 2015

(54) LIGHT-EMITTING KEYBOARD, ILLUMINATING STRUCTURE THEREOF, AND KEYCAP THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ming-Fu Yen, New Taipei (TW); Chien-Hsin Lee, New Taipei (TW); Chin-Fa Wu, New Taipei (TW); Yuan-Chieh Cheng, Taipei (TW); Chen-Yu Tsai, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 186 days.

(21) Appl. No.: 13/939,350

(22) Filed: Jul. 11, 2013

(65) Prior Publication Data

US 2014/0307413 A1 Oct. 16, 2014

(30) Foreign Application Priority Data

Apr. 15, 2013 (CN) .......................... 2013 1 0129835

(51) Int. Cl.

| | |
|---|---|
| ***G01D 11/28*** | (2006.01) |
| ***H01H 9/16*** | (2006.01) |
| ***H01H 13/83*** | (2006.01) |

(52) U.S. Cl.

CPC ............... *H01H 9/161* (2013.01); *H01H 13/83* (2013.01); *H01H 2219/03* (2013.01); *H01H 2219/044* (2013.01); *H01H 2219/062* (2013.01); *H01H 2221/07* (2013.01); *H01H 2223/034* (2013.01); *H01H 2223/038* (2013.01)

(58) Field of Classification Search

CPC . H03K 17/9622; H03K 17/98; H03K 17/975; H01H 13/70; H01H 13/83; H01H 2219/044; H01H 2219/062; G02B 6/0055; G02B 6/0043

USPC ................ 362/23.03, 602, 607, 23.05, 23.07, 362/23.09, 23.1, 23.12, 23.14, 23.16, 23.17, 362/610, 615, 617, 621, 628, 633; 341/22, 341/33, 31; 200/5 A, 310, 314, 344

See application file for complete search history.

(56) References Cited

U.S. PATENT DOCUMENTS

| | | | | |
|---|---|---|---|---|
| 5,304,764 A * | 4/1994 | Kobayashi | .................... | 200/314 |
| 2007/0084710 A1 * | 4/2007 | Koyano et al. | ................ | 200/341 |

(Continued)

*Primary Examiner* — Thomas A Hollweg
*Assistant Examiner* — Kevin Quarterman
(74) *Attorney, Agent, or Firm* — Li & Cai Intellectual Property (USA) Office

(57) ABSTRACT

A light-emitting keyboard includes a keycap, a frame and a solid-state lighting source. The keycap has a light-entrance portion formed on the periphery thereof, and a touch surface for pressing by user. The keycap is made of light-guiding material and defines a light-guiding path from the light entrance portion to the touch surface. The frame is arranged adjacent to the keycap and surrounds the periphery of the keycap. The frame is made of light-guiding material and forms at least one light-outputting surface. The at least one light-outputting surface is contiguous to the light-entrance portion. The solid-state lighting source is fixed to the frame and emits light from the light-outputting surface into the light-entrance portion by the light-guiding path, and exits from the touch surface of the keycap. The instant disclosure also provides an illuminating structure of the keyboard, and a keycap thereof.

22 Claims, 6 Drawing Sheets

(56) References Cited

U.S. PATENT DOCUMENTS

| | | | | |
|---|---|---|---|---|
| 2008/0273318 | A1* | 11/2008 | Chou | 362/85 |
| 2010/0103644 | A1* | 4/2010 | Lin et al. | 362/29 |
| 2011/0120848 | A1* | 5/2011 | Su et al. | 200/5 A |
| 2012/0013490 | A1* | 1/2012 | Pance | 341/28 |
| 2012/0186951 | A1* | 7/2012 | Wu et al. | 200/4 |
| 2012/0298491 | A1* | 11/2012 | Ozias et al. | 200/314 |
| 2014/0034472 | A1* | 2/2014 | Krumpelman et al. | 200/5 A |
| 2014/0055289 | A1* | 2/2014 | Chou | 341/22 |
| 2014/0138230 | A1* | 5/2014 | Chen | 200/5 A |
| 2014/0151205 | A1* | 6/2014 | Chou | 200/314 |

* cited by examiner

LIGHT-EMITTING KEYBOARD, ILLUMINATING STRUCTURE THEREOF, AND KEYCAP THEREOF

BACKGROUND OF THE INVENTION

1. Field of the Invention

The present disclosure relates to a light-emitting keyboard, an illuminating structure thereof, and a keycap thereof; in particular, to a keyboard providing lighting to illuminate the keycap.

2. Description of Related Art

Light-emitting keyboards which allow electronic devices having keyboards to be used under different lighting conditions have been disclosed. Conventional light-emitting keyboards mainly use backlight modules as light source. The backlight module is positioned behind the keys, including a light-guiding plate and a light source positioned on one side of the light-guiding plate, e.g. a light-emitting diode (LED) or an electroluminescent (EL) light source. The light-guiding plate guides incident light toward the backside of the key. The bottom portion of the light-guiding plate has a reflector plate for reflecting light back into the light-guiding plate. Then, a microstructure on the front side of the light-guiding plate emits light toward the underside of the key.

A disadvantage of the conventional method described above is that the light source must pass through the light-guiding plate, be emitted from the microstructure on the top face of the light-guiding plate, pass through a bridge board of a scissors-type mechanism, and travel a distance before reaching the underside of the key. Therefore not only is much of the light source wasted and ineffectively used, but also leaked from the gaps between keys creating undesired lighting thereat.

Moreover, the biggest disadvantage of the conventional light-emitting keyboard is the increased height of the overall keyboard. Neither the light-guiding plate nor light-emitting diodes arranged in array is able to prevent the thickening of the keyboard.

Hence, the present inventor believes the above mentioned disadvantages can be overcome, and through devoted research combined with application of theory, finally proposes the present disclosure which has a reasonable design and effectively improves upon the above mentioned disadvantages.

SUMMARY OF THE INVENTION

An object of the present disclosure is to provide a light-emitting keyboard which more efficiently guides light into the key for providing lighting illuminating the key.

Additionally, an object of the present disclosure is to provide a light-emitting keyboard which provides an illuminating structure for illuminating the keycap while maintaining the original height of the keyboard.

In order to achieve the aforementioned objects, according to an embodiment of the present disclosure, a light-emitting keyboard is provided including a keycap, a frame and a solid-state lighting source. The keycap has a light entrance portion formed on the periphery thereof, and a touch surface for pressing by a user. The keycap is made of light-guiding material and defines a light-guiding path from the light entrance portion to the touch surface. The frame is proximal to and surrounds the periphery of the key cap. The frame is made of light-guiding material and has at least one light-outputting surface contiguous to the light-entrance portion. The solid-state lighting source is fixed to the frame. The light of the solid-state lighting source is emitted from the light-outputting surface into the light-entrance portion, passes through the light-guiding path, and exits from the touch surface of the keycap.

In order to achieve the aforementioned objects, according to an embodiment of the present disclosure, an illuminating structure of the light-emitting keyboard is provided. The light-emitting keyboard has a plurality of keycaps. The illuminating structure includes a frame and a solid-state lighting source. The frame is made of light-guiding material and is disposed at the top surface of the light-emitting keyboard. The frame includes a plurality of outer frame strips disposed at the periphery of the keycaps, a plurality of inner frame strips connected in a grid pattern to the inner edges of the outer frame strips and extending to the peripheries of the keycaps, and a plurality of light-outputting surface facing toward the peripheries of the keycaps. The solid-state lighting source is disposed at the underside of one of the outer frame strips.

Additionally, in concert with the abovementioned disclosures, the present disclosure further provides a keycap of the light-emitting keyboard, including a top wall having a touch surface for pressing by a user, and a plurality of lateral walls extending from the periphery of the top wall. At least one lateral wall is formed with a light-entrance portion. The interior of the keycap defines a light-guiding path from the light-entrance portion to the touch surface.

The present disclosure has the following advantages. The present disclosure utilizes frame positioned at the periphery of the keycaps as illuminating structure, directly guiding the light from the periphery of the keycaps into the keycaps, such that the keycaps and emit light. Different from the conventional methods which dispose light-emitting diodes and light-guiding plates at the bottom portion of the keyboard, the present disclosure prevents an increase in the height of the keyboard.

Additionally, the light-outputting surface of the frame of the present disclosure is contiguous to the light-entrance portion of the keycap. The light can enter the keycap more efficiently. The light transmission path of the present disclosure is shorter, enters the keycap more efficiently, and is more environmentally friendly.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
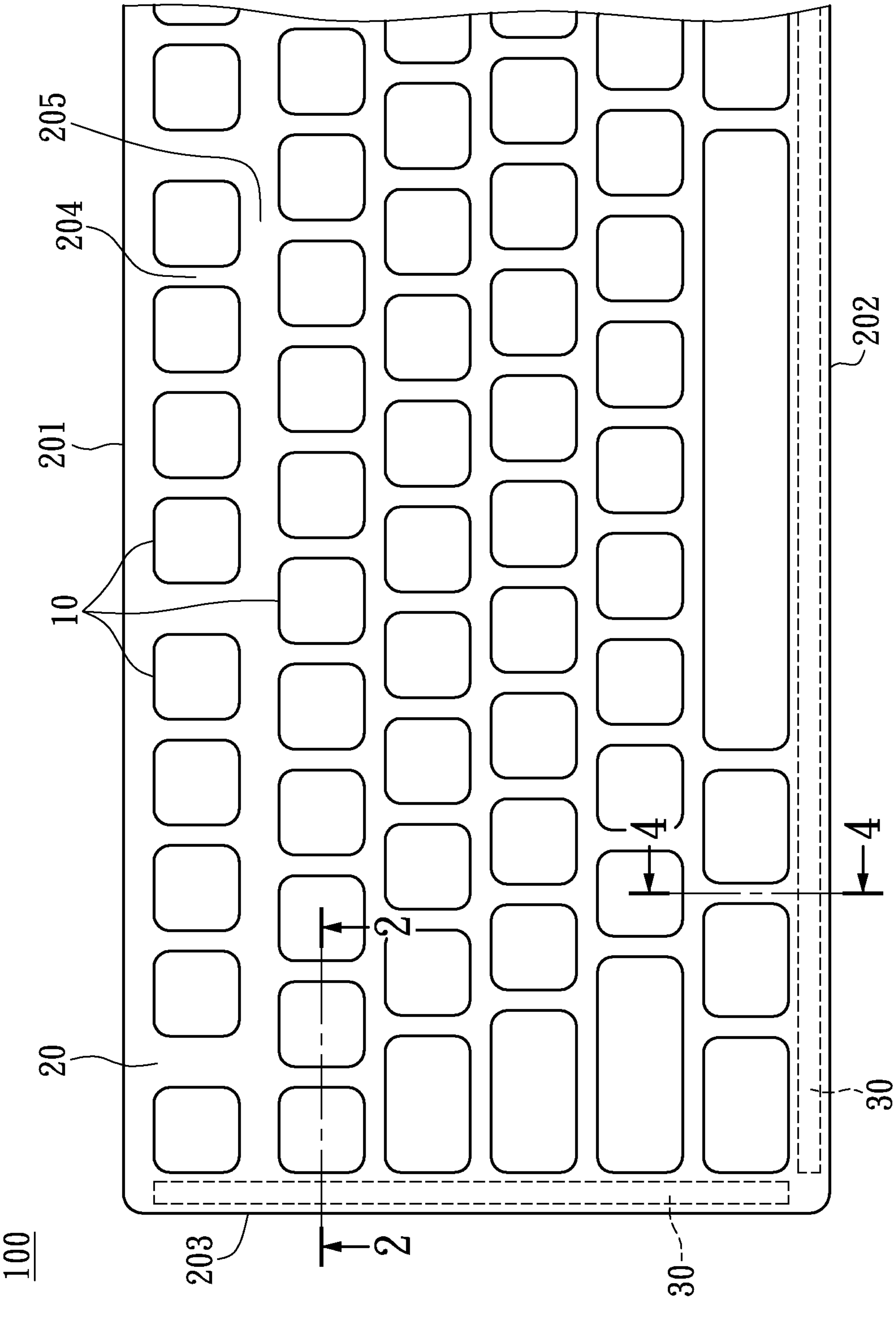
FIG. 1 shows a top view of the light-emitting keyboard according to the present disclosure.

FIG. 1 shows a top view of the light-emitting keyboard according to the present disclosure. The light-emitting keyboard 100 of the present disclosure includes a plurality of keycaps 10, a frame 20 proximal to and surrounding the periphery of the keycaps 10, and a solid state lighting source 30 fixed to the underside of the frame 20. The present disclosure is appropriate for application on light-emitting keyboard having the frame 20 with grid structure and positioned at the top surfaces of the keyboards, commonly referred to as chocolate keyboards. The frame 20 and the solid-state lighting source 30 form an illuminating structure for illuminating the keycaps 10.

Figure 2:
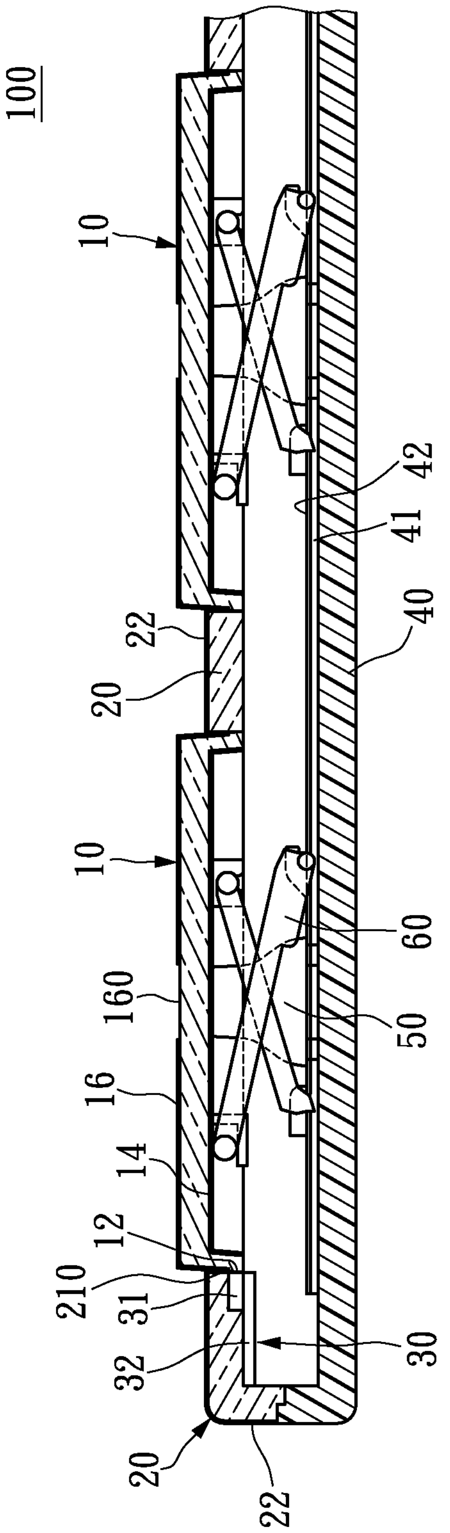
FIG. 2 shows a cross-sectional view along line 2-2 of FIG. 1 according to the present disclosure.

FIG. 2 shows a cross-sectional view along line 2-2 of FIG. 1 according to the present disclosure. In the present embodiment, each keycap 10 has a light-entrance portion 12 formed on the periphery thereof and a touch surface 16 for pressing by a user. The keycaps 10 are made of light-guiding material and each of the keycaps 10 defines a light-guiding path from its light-entrance portion to its touch surface 16. The light-guiding material can be polycarbonate (PC), poly-methyl methacrylate (PMMA, also known as acrylic), but is not limited hereto.

The frame 20 can be an integration of the upper case and the lower case 40 of the light-emitting keyboard 100. The frame 20 is in practice a one-piece structure formed with a plurality of openings for exposing the keycaps 10. The frame 20 can be made of light-guiding material and has at least one light-outputting surface 210 contiguous to the light-entrance portions 12. The light of the solid-state lighting source 30 is emitted into the light-entrance portion 12 from the light-outputting surface 210, passes through the light-guiding path, and exits from the touch surface 16 of the keycap 10. By this configuration, the light-emitting keyboard of the present disclosure cleverly uses the frame 20 of the keyboard 100 to effectively reduce the overall height of the keyboard, unlike the conventional method which disposes a light-guiding plate at the bottom portion of the keyboard. However, the present disclosure is not limited hereto. The frame 20 can be only a portion of the upper case. In other words, the frame can be merely a light-guiding layer adhered or fixed onto the upper case.

As shown in FIG. 2, an elastic unit 50 and a cross beam 60 supporting the keycap 10, also called a scissor-type support, are disposed under each of the keycaps 10 of the present embodiment. The keyboard 100 has a beam support layer 41 disposed at the top surface of the lower case 40, and a conducting circuit layer 42 disposed at the top surface of the beam support layer 41. The cross beam 60 is disposed on the beam support layer 41. The elastic unit 50 is disposed on the conducting circuit layer 42. When the keycap 10 is pressed downward, the elastic unit 50 triggers downwardly a signal area on the conducting circuit layer 42.

As shown in FIG. 1, in order to describe the details of the present embodiment, the frame 20 can be partitioned into a plurality of outer frame strips 201, 202, 203 positioned at the periphery of the keycaps 10, and a plurality of inner frame strips 204, 205 connected in a grid pattern to the inner edges of the outer frame strips 201, 202, 203 and extending to the peripheries of the keycaps 10. The solid-state lighting source 30 can be a light-emitting diode light strip, fixed to the underside of one of the outer frame strips. In the present embodiment, as shown in FIG. 1, a light-emitting diode light strip is disposed at the lower outer frame strip 202 and another light-emitting diode light strip is disposed at the lateral outer frame strip 203 of the keyboard (at positions labeled 30). However, the position of the solid-state lighting source 30 of the present disclosure is not limited thereto, and can amount to at least one and be disposed at the outer frame strip or the inner frame strip of the frame 20 according to the luminance of the light source, the evenness of lighting spread across the keyboard, etc. For example, two light-emitting diode light strips can be disposed at the left and right lateral outer frame strips (as shown by 203, the other side omitted), and the light is guided along the horizontal inner frame strips 205 to the keycaps 10.

Refer again to FIG. 2 regarding an embodiment using light-emitting diode light strip as solid-state lighting source 30. The solid-state lighting source 30 can be disposed in the frame 20 by insert molding method, so that a plurality of the light-emitting diode package devices 31 is fixed in the frame 20, and the light-emitting diode package devices 31 emit light in the frame 20. Each of the light-emitting diode package devices 31 disposed in the frame 20 by insert molding is formed by a packaging process, in which a single chip is packaged into a single package device. Then, the plurality of light-emitting diode devices 31 is arranged in the frame 20. The quantity of arranged light-emitting diode package devices 31 is determined by the length of the solid-state lighting source 30. Regarding details of insert molding, refer to U.S. Pat. No. 5,043,114. A circuit layer 32 can be disposed at the underside of the frame 20, preferably a flexible printed circuit (FPC) for conducting electricity to the light-emitting diode package device 31. In other words, the light-emitting diode light strip can include the circuit layer 32 and a plurality of light-emitting diode package devices 31 disposed on the circuit layer 32.

Figure 3A:
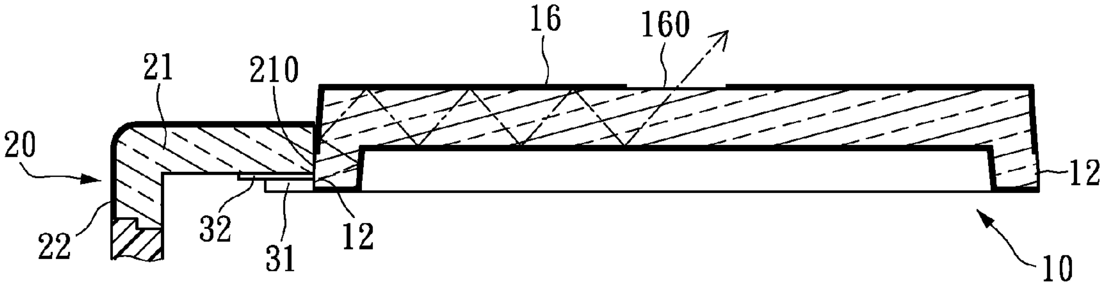
FIG. 3A shows a light-emitting schematic diagram of the light-emitting keyboard from the frame to the keycap according to the present disclosure.

FIG. 3A shows a light-emitting schematic diagram of the light-emitting keyboard from the frame to the keycap according to the present disclosure. The frame 20 includes a light-guiding layer 21 for guiding the light of the solid-state lighting source 30, and a shield layer 22 positioned at the outer surface of the light-guiding layer 21. The light-outputting surface 210 is formed on the light-guiding layer 21. The shield layer 22 can be paint having a reflecting quality or another light-shielding material integrated with the light-guiding layer 21. The shield layer 22 prevents leaking of light. The light reflects totally (total reflection) within the light-guiding layer 21 and is emitted at the light-outputting surface 210. The light-outputting surface 210 can have a microstructure for providing the light with more directions for emission. The light is emitted from the light-outputting surface 210 of the frame 20 and enters the light-entrance portions 12 of the keycaps 10, reflects completely within the keycaps 10, and is then emitted from the symbol 160 of the touch surface 16, such that the keycaps have a light-emitting effect. The light-emitting diode packages 31 of the present embodiment are disposed at the underside of the light-guiding layer 21.

Compared that of the conventional method, the light of the present disclosure has a shorter travel distance and more effectively enters the keycaps. The conventional method uses a backlight method to dispose a light-guiding plate directly below the keycaps. The light is guided by the edges of the light-guiding plate, and after reflection and emission, still needs to pass through the elastic units below the keycaps, and enter into the keycaps from the underside of the keycaps. The distance between the light and the keycap in the conventional method is considerable, thereby requiring a greater luminance to compensate for the light losses due to a greater distance. The distance between the light and the keycap of the present disclosure is shorter, and the energy level of the light source can be more economical compared to that of the conventional method, which is more environmentally friendly.

To enhance the light transmission within the keycaps 10, as shown in FIG. 2, the underside of the keycaps 10 preferably each have a reflecting layer 14, such as paint coated thereon. The touch surface 16 can likewise be a reflecting layer, hollowly forming the symbol 160.

Figure 3B:
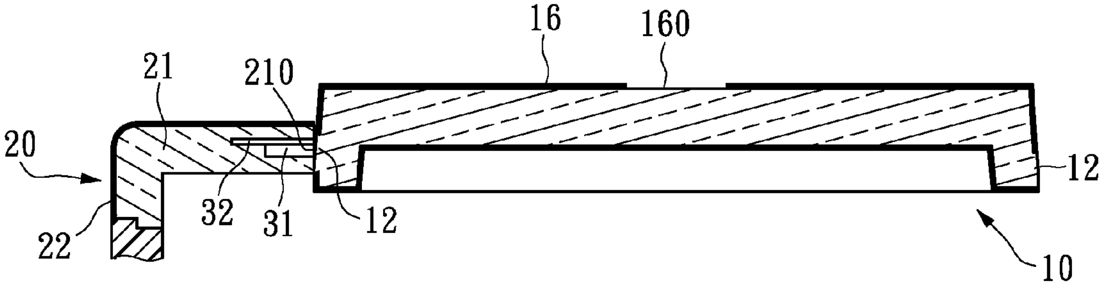
FIG. 3B shows a light-emitting schematic diagram of the light-emitting keyboard according to a second embodiment of the present disclosure.

FIG. 3B shows a light-emitting schematic diagram of the light-emitting keyboard according to a second embodiment of the present disclosure. FIG. 3B differs from FIG. 3A in that the light-emitting diode package 31 is directly embedded into the light-guiding layer 21 and directly faces the light-entrance portion 12 of the keycap 10.

Figure 3C:
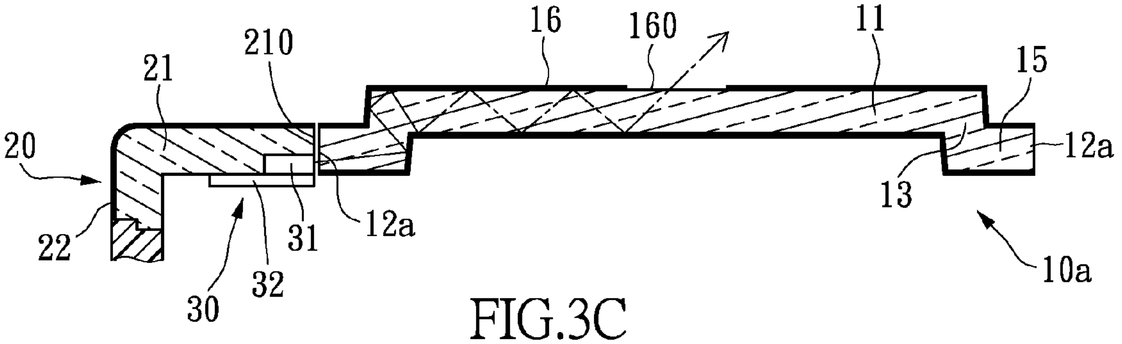
FIG. 3C shows a light-emitting schematic diagram of the light-emitting keyboard according to a third embodiment of the present disclosure.

FIG. 3C shows a light-emitting schematic diagram of the light-emitting keyboard according to a third embodiment of the present disclosure. FIG. 3C differs from FIG. 3A in that the keycap 10*a* has a top portion 11, a plurality of lateral walls 13 extending downward from the periphery of the top portion 11, and a plurality of extension walls 15 extending from the plurality of lateral walls 13. The light-entrance portion 12*a* is formed at the lateral face of the extension wall 15. The light-entrance portion 12*a* and the light-outputting surface 210 are level and planar.

Figure 3D:
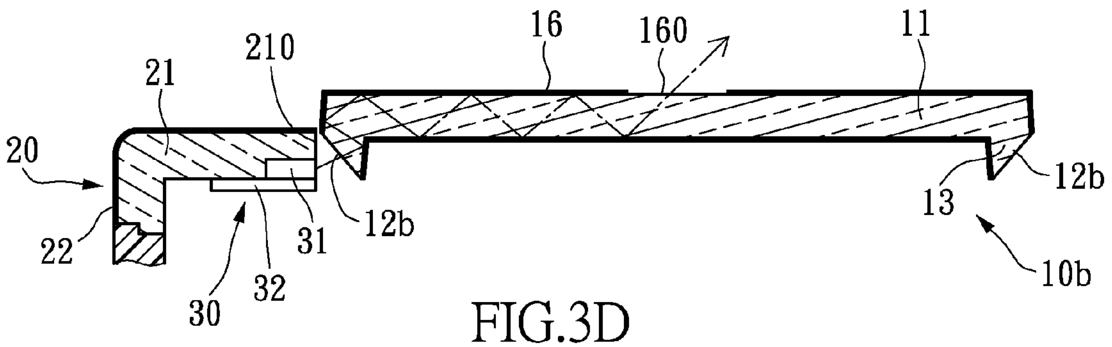
FIG. 3D shows a light-emitting schematic diagram of the light-emitting keyboard according to a fourth embodiment of the present disclosure.

FIG. 3D shows a light-emitting schematic diagram of the light-emitting keyboard according to a fourth embodiment of the present disclosure. FIG. 3D differs from FIG. 3A in that the light-entrance portion 12*b* is formed at the underside of the lateral wall 13 and is slanted. In other words, the light-entrance portion 12*b* at the bottom end of the lateral wall 13 of the keycap 10*b* is a slanted face, and slants toward the light-outputting surface 210 of the frame 20.

Figure 3E:
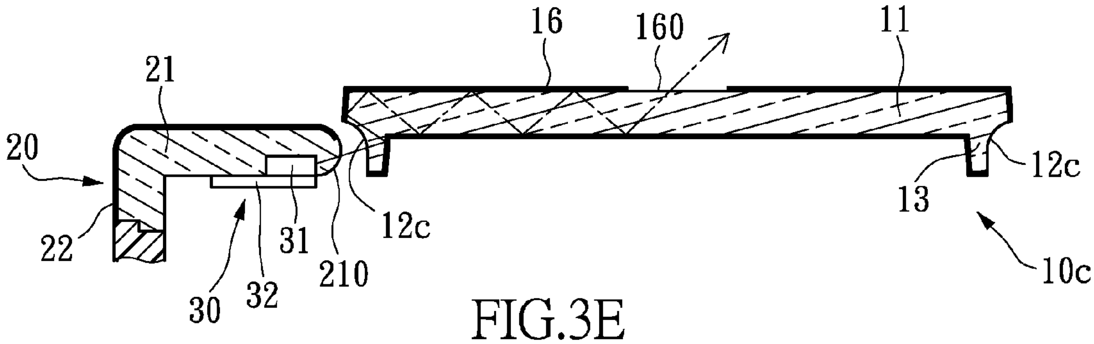
FIG. 3E shows a light-emitting schematic diagram of the light-emitting keyboard according to a fifth embodiment of the present disclosure.

FIG. 3E shows a light-emitting schematic diagram of the light-emitting keyboard according to a fifth embodiment of the present disclosure. FIG. 3E differs from FIG. 3D in that the light-entrance portion 12*c* at the bottom end of the lateral wall 13 of the keycap 10*c* is concave, and that the light-outputting surface 210 of the frame is convex. This configuration gathers light such that the light enters the light-entrance portion 12*c* more focused. In the present embodiment, the light-entrance portion 12*c* is further formed with a micro-structure.

Figure 3F:
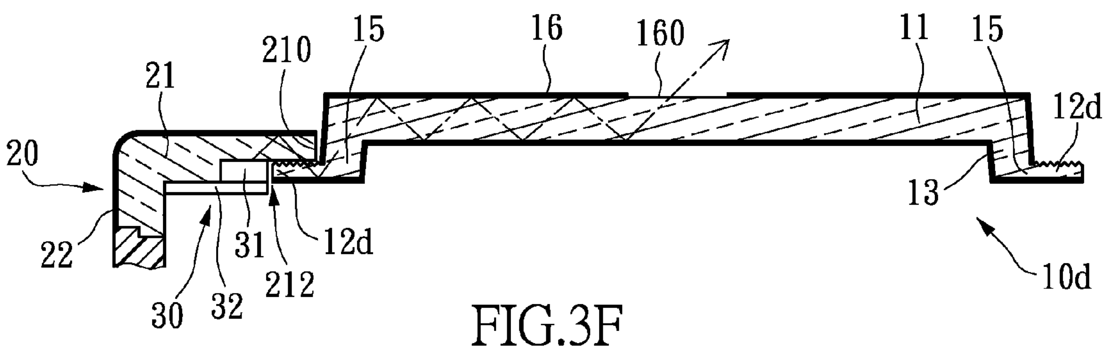
FIG. 3F shows a light-emitting schematic diagram of the light-emitting keyboard according to a sixth embodiment of the present disclosure.

FIG. 3F shows a light-emitting schematic diagram of the light-emitting keyboard according to a sixth embodiment of the present disclosure. FIG. 3F differs from FIG. 3A in that the keycap 10*d* has a top portion 11, a plurality of lateral walls 13 extending downward from the periphery of the top portion 11, and a plurality of extension walls 15 extending from the plurality of lateral walls 13. The light-entrance portion 12*d* is formed at the top face of the extension wall 15. The light-guiding portion 21 of the frame 20 is formed with a recessed portion 212 corresponding to the extension wall 15. The light-outputting surface 210 of the frame 20 is formed at the underside of the recessed portion 212, is level with the light-entrance portion 12*d*, and is a horizontal plane.

The states of the above embodiments are all in an unpressed state, wherein the light-outputting surface 210 of the frame is contiguous to the light-entrance portion 12 of the keycap 10. In other words, before a user presses the keycap 10, he can clearly see the symbol 160 displayed on the touch surface 16 of the keycap 10. When the user presses the keycap 10, seeing the touch surface 16 of the keycap 10 is no longer required. Even though less light enters the keycap 10 when the light-entrance portion 12 departs from the light-outputting surface 210, the operation of the keyboard is not affected.

Figure 4:
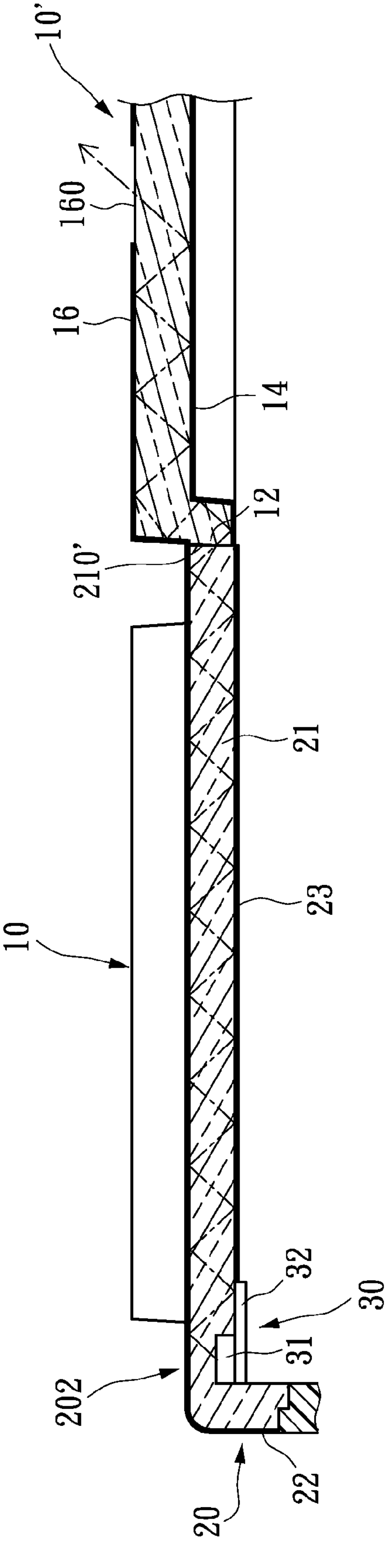
FIG. 4 shows a cross-sectional view along line 4-4 of FIG. 1 according to the present disclosure.

FIG. 4 shows a cross-sectional view along line 4-4 of FIG. 1 according to the present disclosure. The figure shows the solid-state lighting source 30 of the present embodiment being disposed at the underside of the outer frame strip 202 of the frame 20. The light can reach the relatively far-away keycap 10' through the light-guiding portion 21, be emitted from another light-outputting surface 210', and enter the light-entrance portion 12 of the keycap 10'. The present embodiment also shows that a reflector layer 23 can be disposed at the underside of the light-guiding layer 21 for assisting the reflection of the light in the light-guiding layer 21.

Figure 5:
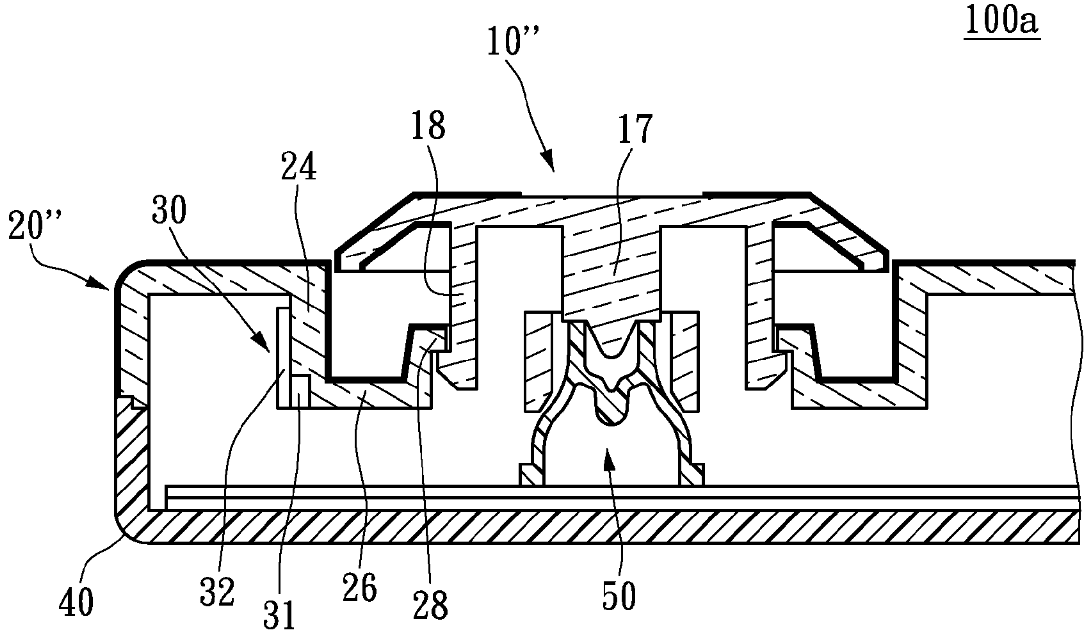
FIG. 5 shows a light-emitting schematic diagram of the light-emitting keyboard according to a seventh embodiment of the present disclosure.

FIG. 5 shows a light-emitting schematic diagram of the light-emitting keyboard 100*a* according to a seventh embodiment of the present disclosure. The present disclosure not only can be applied on keycaps of scissor type mechanism, but also on keycaps having a restrictive guiding structure. The keycap 10" of the present embodiment has an abutting portion 17 extending downward from its underside, and a restricting portion 18 positioned at the periphery of the abutting portion 17. An elastic unit 50 is disposed below the keycap 10". The restricting portion 18 can amount to two, respectively positioned at the two sides of the abutting portion 17. Alternatively, the restricting portion 18 can be tube-shaped surrounding the abutting portion 17. The frame 20" extends downward to form a vertical portion 24 and a horizontal portion 26. The horizontal portion 26 is formed with a retaining portion 28. The retaining portion 28 is similar to a hook for hooking the restricting portion 18. The retaining portion 28 and the restricting portion 18 work together to form a restrictive guiding structure. In the present embodiment, the parts of the retaining portion 28 and the restricting portion 18 engaging each other respectively form the light-outputting surface and the light-entrance portion, for providing the light of the solid-state lighting source 30 to be emitted from the light-outputting surface into the light-entrance portion of the keycap 10".

The present disclosure has the following advantages. The present disclosure utilizes the frame at the periphery of the keycaps to form an illuminating structure, and guide the light directly from the periphery of the keycaps into the keycaps, such that the keycaps can emit light, forming a light-emitting keyboard. Different from the conventional methods which dispose light-emitting diodes and light-guiding plates at the bottom portion of the keyboard, the present disclosure prevents an increase in the height of the keyboard. Therefore, the present disclosure can maintain the height of the original keyboard.

The present disclosure utilizes the frame positioned at the periphery of the keycaps to form an illuminating structure. Light emitted from the light-outputting surface of the frame enters the light-entrance portion of the keycap. Light more efficiently enters the keycap. The light of the present disclosure has a shorter travel distance, more effectively enters the keycap, and is more environmentally friendly.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A light-emitting keyboard comprising:

a keycap, having an abutting portion extending downward from an underside thereof, a restricting portion positioned at a periphery of the abutting portion, a light-entrance portion formed at a periphery thereof and a touch surface for pressing by a user, made of light-guiding material, defining a light-guiding path therein from the light-entrance portion to the touch surface; wherein the light-entrance portion is formed on the restricting portion;

a frame, proximal to and surrounding the periphery of the keycap, made of light-guiding material, and having at least one light-outputting surface contiguous to the light-entrance portion; wherein the frame extends downward forming a vertical portion and a horizontal portion, the horizontal portion is formed with a retaining portion, the retaining portion hooks the restricting portion, the light-outputting surface is formed on the retaining portion; and a solid-state lighting source, fixed to the frame, wherein the light of the solid-state lighting source is emitted from the light-outputting surface, enters the light-entrance portion, passes through the light-guiding path, and then emitted from the touch surface of the keycap.

2. The light-emitting keyboard according to claim 1, wherein the amount of the keycap is plural, the frame includes a plurality of outer frame strips positioned at the periphery of the keycaps and a plurality of inner frame strips connected in a grid pattern to the inner edges of the outer frame strips and extending to the peripheries of the keycaps.

3. The light-emitting keyboard according to claim 2, wherein the solid-state lighting source is a light-emitting diode light strip including a circuit layer and a plurality of light-emitting diode package devices disposed on the circuit layer.

4. The light-emitting keyboard according to claim 1, wherein the frame includes a light-guiding layer for guiding the light of the solid-state lighting source and a shield layer positioned on the outer surface of the light-guiding layer, and the light-outputting surface is formed on the light-guiding layer.

5. The light-emitting keyboard according to claim 4, wherein the light-outputting surface of the light-guiding layer and the light-entrance portion of the keycap are planar.

6. The light-emitting keyboard according to claim 5, wherein the light-entrance portion of the keycap is further formed with a microstructure.

7. The light-emitting keyboard according to claim 4, wherein the light-outputting surface of the light-guiding layer is convex, and the light-entrance portion of the keycap is concave.

8. The light-emitting keyboard according to claim 7, wherein the light-entrance portion of the keycap is further formed with a microstructure.

9. The light-emitting keyboard according to claim 1, wherein the underside of the keycap has a reflecting layer.

10. The light-emitting keyboard according to claim 1, wherein the solid-state lighting source is a light-emitting diode package device disposed in the frame by insert molding.

11. The light-emitting keyboard according to claim 1, further comprising an elastic unit disposed below the keycap and a cross beam supporting the keycap.

12. The light-emitting keyboard according to claim 1, further comprising an elastic unit disposed below the keycap, the elastic unit is positioned below the abutting portion.

13. The light-emitting keyboard according to claim 1, wherein the keycap has a top wall and a plurality of lateral walls extending downward from the periphery of the top wall, and the light-entrance portion is formed on at least one of the lateral faces of the lateral walls.

14. The light-emitting keyboard according to claim 1, wherein the keycap has a top wall, a plurality of lateral walls extending downward from the periphery of the top wall, and the light-entrance portion is formed on at least one of the bottom faces of the lateral walls and is slanted.

15. The light-emitting keyboard according to claim 1, wherein the keycap has a top wall, a plurality of lateral walls extending downward from the periphery of the top wall, at least one of the lateral walls extend outward to form an extension wall, and the light-entrance portion is formed on the top face of the extension wall.

16. An illuminating structure of a light-emitting keyboard having a plurality of keycaps, each of the keycaps having an abutting portion extending downward from an underside thereof, a restricting portion positioned at a periphery of the abutting portion, and a light-entrance portion formed on the restricting portion for passing light along a light-guiding path to a touch surface thereof, comprising:

a frame, made of light-guiding material, disposed on the top face of the light-emitting keyboard, including a plurality of outer frame strips disposed at the periphery of the keycaps and a plurality of inner frame strips connected in a grid pattern to the inner edges of the outer frame strips and extending to the peripheries of the keycaps, and a plurality of light-outputting surfaces facing the light-entrance portions of the keycaps correspondingly;

wherein the frame extends downward forming a plurality of vertical portion and a plurality of horizontal portion, each of the horizontal portions is formed with a retaining portion, the retaining portions hook the restricting portions correspondingly, the light-outputting surfaces are respectively formed on the retaining portions; and a solid-state lighting source, disposed at the underside of one of the outer frame strips.

17. The illuminating structure of a light-emitting keyboard having a plurality of keycaps according to claim 16, wherein the solid-state lighting source is a light-emitting diode light strip.

18. The illuminating structure of a light-emitting keyboard having a plurality of keycaps according to claim 16, wherein the frame includes a light-guiding layer for guiding the light of the solid-state lighting source and a shield layer positioned on the outer surface of the light-guiding layer, and the light-outputting surface is formed on the light-guiding layer.

19. The illuminating structure of a light-emitting keyboard having a plurality of keycaps according to claim 18, wherein the light-outputting surface of the light-guiding layer is planar or convex.

20. A keycap of a light-emitting keyboard, comprising:

a top wall, having a touch surface for pressing by an user; and a plurality of lateral walls, extending downward from the periphery of the top wall, wherein at least one lateral wall is formed with a light-entrance portion at the periphery thereof, and the keycap defines a light-guiding path therein from the light-entrance portion to the touch surface;

wherein at least one of the lateral walls extends outward to form an extension wall, and the light-entrance portion is formed on the top face of the extension wall.

21. The keycap of a light-emitting keyboard according to claim 20, wherein the light-entrance portion is formed on a lateral face of at least one of the lateral walls.

22. The keycap of a light-emitting keyboard according to claim 20, wherein the light-entrance portion is formed on an underside of at least one of the lateral walls, and is a slanted face or concave.

* * * * *